(No Model.)

S. W. TANNER.
CAR WHEEL.

No. 394,312. Patented Dec. 11, 1888.

Witnesses.
Howard F. Eaton.
Frederick L. Emery.

Inventor.
Samuel W. Tanner.
By Lemby & Gregory,
Attys.

UNITED STATES PATENT OFFICE.

SAMUEL W. TANNER, OF NEW YORK, N. Y., ASSIGNOR TO THE TANNER ANTI-FRICTION WHEEL COMPANY, OF ILLINOIS.

CAR-WHEEL.

SPECIFICATION forming part of Letters Patent No. 394,312, dated December 11, 1888.

Application filed February 7, 1888. Serial No. 263,248. (No model.)

*To all whom it may concern:*

Be it known that I, SAMUEL W. TANNER, of New York, in the county and State of New York, have invented an Improvement in Car-Wheels, of which the following description, in connection with the accompanying drawings, is a specification, like letters on the drawings representing like parts.

This invention relates to car-wheels of that class wherein the wheel is loosely mounted upon its axle, it being an improvement upon the car-wheel shown and described in United States Patent No. 358,951, granted to me March 8, 1887. The car-wheel shown in the patent referred to is provided with a projecting or elongated hub having its end cut away to receive a collar or flange on the axle, the said collar or flange forming the bearing for the inner end of the said hub, the outer end of the said hub, located below the tread of the wheel, having its bearing-surfaces composed of anti-friction rollers.

The car-wheel referred to possesses advantages over car-wheels of ordinary construction; but when traveling around curves a very considerable friction is created between the hub and the collar or flange.

It is one of the objects of this invention to obviate excessive friction at the inner end of the elongated hub; and I accomplish my object by mounting upon the axle a second set of anti-friction rollers to form the bearing-surfaces for the inner end of the elongated hub. The wheel has bearing-surfaces on both sides of the tread and is substantially evenly balanced, the friction being reduced to a minimum, thereby obtaining an easy and even running wheel.

Other features of my invention will be pointed out in the claims at the end of this specification.

Figure 1:
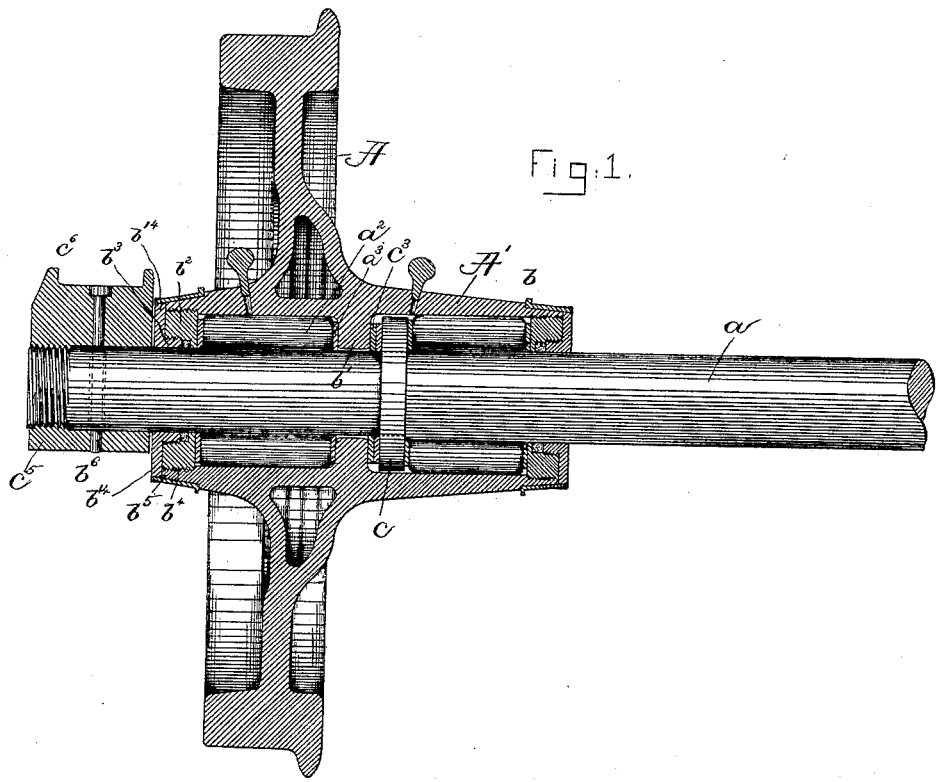
Figure 3:
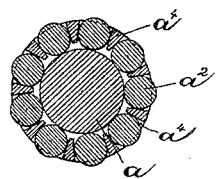
Figure 2:
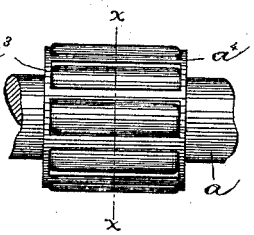
Figure 4:

Figure 1 shows in section and elevation a car-wheel embodying my invention, the axle and anti-friction rollers being in elevation; Fig. 2, a detail of the anti-friction rollers; Fig. 3, a section of Fig. 2 on line $x\ x$, and Fig. 4 a detail to be referred to.

The wheel A, having the elongated hub A', may be made of steel or other usual or well-known material.

The wheel A is loosely mounted upon its axle $a$, it having a bearing located substantially below the tread of the wheel, consisting of anti-friction rollers $a^2$, mounted in a cage composed of sides $a^3$ and ribs $a^4$, separating the said rollers, the said cage being fitted upon the axle $a$, all substantially as in the patent referred to.

The elongated hub A' is cut away or enlarged in diameter on its inner surface to receive a set of anti-friction rollers, $b$, mounted in a cage in a similar manner to those under the tread of the wheel. The cage containing the friction-rollers $a^2$ abuts against one side of a flange, $b'$, on the wheel, and is maintained in position, as shown, by a packing-nut comprising two parts, $b^2\ b^3$, the part $b^2$ being screw-threaded on its outer periphery to engage threads on the inner surface of the hub, as at $b^4$, and also threaded on its inner periphery to be engaged by threads on the outer periphery of the part $b^3$, having a flange, as $b^{14}$, to abut against the outer end, as $b^5$, of the hub, an annular groove being formed by the parts $b^2\ b^3$ to receive packing $b^6$. The cage containing the anti-friction rollers $b$ abuts against a collar or flange, $c$, preferably shrunk upon the axle $a$, and between the said collar and flange $c$, as shown, are two washers, $c^3$. The flange $c$ in practice takes up or receives the end-thrust caused by the flange of the wheel striking the rail in going around curves. This cage is retained in place and prevented from longitudinal movement upon the axle by a packing-nut similar to that used with the cage containing the anti-friction rollers $a^2$.

The packing-nuts referred to are secured to the wheel and prevented from becoming unscrewed therefrom by a key, shown as a substantially T-shaped bar, $c^4$, to fit a substantially T-shaped socket or groove in the flange $b^{14}$ and hub of the wheel.

The axle is screw-threaded at its ends, as shown, to engage screw-threads of a box, $c^5$, which in practice supports the equalizer-bar, (not shown,) the said axle being prevented from rotating, as shown, by a pin, $c^6$.

By means of the second set of anti-friction rollers $b$ a more evenly-balanced wheel is secured, the friction is reduced to a minimum, and an easy and even running wheel is obtained.

I claim—

1. A wheel provided with an elongated hub, A′, and an axle having a flange, as $c$, and upon which the said wheel is loosely mounted, combined with two independent sets of anti-friction rollers, as $a^2\, b$, on opposite sides of the said flange, to form the bearing-surfaces for the said wheel and elongated hub, and with a packing-nut to secure the said rollers in position, substantially as described.

2. A wheel provided with an elongated hub, A′, and an axle provided with a flange, as $c$, and upon which the said wheel is loosely mounted, combined with two independent sets of anti-friction rollers, as $a^2\, b$, on opposite sides of the said flange, to form the bearing-surfaces for the said wheel and elongated hub, and with a packing-nut to secure the said rollers in position, and with a key to lock the said packing-nut to the hub, substantially as described.

3. A wheel provided with an elongated hub and having a flange, as $b'$, an axle provided with a flange, as $c$, and upon which the said wheel is loosely mounted, combined with anti-friction rollers $a^2$, located on one side of the flange $b'$ below the tread of the wheel, and with anti-friction rollers $b$, located on the other side of the flange $c$ and below the elongated hub, substantially as described.

In testimony whereof I have signed my name to this specification in the presence of two subscribing witnesses.

SAMUEL W. TANNER.

Witnesses:
JAS. H. CHURCHILL,
C. M. CONE.